3,301,846
DYESTUFFS CONTAINING CHLOROMETHYL OR
BROMOMETHYL GROUPS
Max E. Chiddix, Easton, Pa., and David Irwin Randall,
New Vernon, and Wilhelm Schmidt-Nickels, Little
York, N.J., assignors to General Aniline & Film Corporation, New York, N.Y., a corporation of Delaware
No Drawing. Filed Dec. 31, 1962, Ser. No. 248,241
6 Claims. (Cl. 260—163)

This invention relates to a novel fiber-coloring process, and to a novel group of chromophoric compounds useful in such process.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine, and the vinylsulfone or sulfatoethylsulfone types. Because of the relative scarcity of such dyestuffs and/or their substantial unavailability to large sections of the dyeing trade and/or various disadvantages inherent in their use with respect to procedure, cost, and/or results obtained, there exists a definite need in the industry for new and improved types of reactive dyestuffs and/or methods of dyeing therewith.

It is an object of this invention to provide a novel process for coloring fibers and other articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. A still further object of this invention is the provision of such processes, compounds, and colored products which will not be subject to one or more of the above disadvantages and which depend upon a reaction between the chromophoric compound and the fibers. Other objects and advantages will appear as the description proceeds.

The attainment of the above objects is made possible by this invention which is based upon the discovery that colored fibers with improved properties can be obtained by treating fibers containing a reactive hydrogen atom in the presence of an acid binding agent with an organic dyestuff containing in the molecule at least one halomethyl, i.e., chloromethyl or bromomethyl, radical bonded to a nuclear carbon atom. Such halomethyl radical has been found to be unexpectedly effective in enabling reaction of chromophoric compounds (including dyestuffs per se) containing the same with fibers containing a reactive hydrogen atom in the fiber molecule with liberation of HX, wherein X is halogen, and the production of colored fibers with improved properties with respect to fastness to such deteriorating influences as wet treatments, alkaline and acid conditions, laundry sours, chlorine, and/or light and the like. The present invention accordingly not only resides in the provision of the foregoing process and the colored fibers resulting therefrom, but also in the provision of the chromophoric compounds useful in such process.

As a chromophoric compound into which such halomethyl fiber-reactive radical or radicals may be inserted in accordance with this invention there may be employed any known organic dyestuff. Such dyestuffs are generally of aromatic character in containing at least one carbocyclic or heterocyclic ring, and may generally be selected from among dyestuffs of the azo, quinoid (including anthraquinone, dibenzanthrone, other polycyclic ketones and substituted derivatives thereof), indigoid, thioindigoid, di- and tri-aryl (e.g. phenyl) methanes, nitro, phthalocyanine, stilbene, and sulfur dyestuffs. Venkataraman's "Chemistry of Synthetic Dyes," Academic Press, N.Y., 1952, volumes I and II, discloses a multitude of such organic dyestuffs into which such halomethyl radicals can be inserted in known manner. Further examples of dyestuffs into which such halomethyl radicals may be inserted are also disclosed generically and specifically in, for example, U.S. Patents 2,657,205, 2,892,670, 2,892,671, 2,928,711, 2,940,812, 2,978,289, 3,029,123, 3,031,252, and 3,042,477, and such disclosures are incorporated herein by reference thereto so far as they relate to chromophoric compounds or dyestuffs into which fiber-reactive groups may be inserted.

Optionally, the chromophoric compounds into which the above defined halomethyl radicals are inserted may be colorless compounds containing groups enabling conversion to colored compounds or dyestuffs in situ on the fiber, as for example a group promoting coupling with a diazotized primary aromatic amine or a diazotizable primary amine group whereby the color may be produced in situ on the fiber after reaction of the fiber-reactive radical-containing chromophoric compound with the fiber by suitable development as by, respectively, reaction with a diazotized primary aromatic amine or diazotization and reaction with an azo coupling component. Other mechanisms and/or groupings are of course known for developing color in situ on the fiber, including metallizing, reducing and/or oxidizing treatments and the like. It is to be understood that such colorless compounds are to be considered equivalent to the above described dyestuffs in carrying out the teachings of this invention.

Bonding of a halomethyl radical to a nuclear carbon atom of an organic dyestuff or chromophoric compound such as the phthalocyanines, e.g., copper phthalocyanine, and vat dyestuffs, e.g., dibenzanthrone, may be conventionally carried out by reaction thereof with one to four moles of a halomethylating agent such as bischloromethyl ether or bisbromomethyl ether in sulfuric acid, to insert one to four nuclearly bound chloromethyl or bromomethyl groups therein.

Another and preferred expedient for the production of halomethyl-containing dyestuffs sensitive to a direct chloro- or bromo-methylating reaction involves subjecting a chloromethylated nitroaromatic compound to hydrolysis conditions to convert the chloromethyl groups to methylol groups, subjecting the resulting methylolated nitroaromatic compound to the action of a reducing agent to convert the nitro group to amino, employing the resulting methylolated aminoaromatic compound for reaction with a dyestuff containing a reactive chlorine atom which may be nuclearly substituted or in a chlorosulfonyl group ($SO_2Cl$) or employing such compound as a diazo component for coupling with a known azo coupling component, and finally reacting the resulting methylol-containing dyestuff with hydrochloric or hydrobromic acid to convert the methylol group or groups to fiber-reactive chloromethyl or bromomethyl groups.

In the aforementioned expedient, there is employed as starting compound a mononitrated aromatic compound such as diphenyl, diphenyl ether, naphthalene, anthracene, or preferably benzene, or their derivatives containing up to four halogen (Cl, Br, F, or I), lower alkyl (methyl to butyl and isomers thereof), or corresponding lower alkoxy groups. Such compound is mono- or bis-chloromethylated, generally in meta positions relative to the nitro group in the same nucleus, after which the compound is subjected to known hydrolysis conditions, as by treatment with aqueous sodium or potassium acetate, or alcoholic, to convert the chloromethyl groups to methylol.

Reduction of the nitro group in the resulting intermediate may be carried out in any manner well known in the art. A method involves the well known catalytic hydrogenation process whereby the nitro group is reduced to amino by treating the intermediate with molecular hydrogen in the presence of a suitable catalyst such as Raney nickel, platinum, palladium or their oxides or the like, if desired on a carrier such as charcoal or other known equivalent thereof. Another method of reduction involves use of the well known reduction system containing a metal such as iron, zinc, tin or the like in a strong mineral acid such as sulfuric or hydrochloric acid or the like.

The resulting methylolated amino-aromatic compound has the formula:

(I) $\quad H_2N\text{---}Ar(\text{---}CH_2OH)_n$ wherein Ar represents the nuclear residue of the above mentioned chloromethylated nitroaromatic compound, preferably benzene, and $n$ represents the number of $CH_2Cl$ groups originally present therein, usually 1 or 2. This same intermediate, but with different orientation of the methylol groups, may also be obtained from the known chloromethylated N-acylated anilines such as acetanilide, wherein chloromethylation takes place in para position to produce for example p-chloromethyl acetanilide. Subjecting the latter to hydrolysis conditions simultaneously converts the chloromethyl group to methylol and the acetylamine group to amino.

The above intermediate of Formula I may be employed in a number of different ways in carrying out the teachings of the present invention. In accordance with a preferred embodiment, the intermediate is readily diazotized and coupled in known manner with any desired azo coupling component, followed by reaction of the resulting azo dyestuff with concentrated hydrochloric or hydrobromic acid to convert the methylol groups therein to fiber-reactive chloromethyl or bromoethyl groups, such fiber-reactive azo dyestuffs having the formula:

(II) $\quad B\text{---}N\!=\!N\text{---}Ar(\text{---}CH_2X)_n$ wherein Ar is as defined above, X is Cl or Br, and $n$ has an average value of 1 to 4, and B is the residue of the azo coupling component. The resulting azo dyestuff is readily reacted with fibers containing a reactive hydrogen atom in the presence of an acid binding agent with liberation of HX and the production of colored fibers represented by the formula:

(III) $\quad B\text{---}N\!=\!N\text{---}Ar(\text{---}CH_2\text{---}Fiber)_n$ wherein "Fiber" represents a reactive hydrogen-containing fiber molecule deprived of said reactive hydrogen atom. Dyestuffs or chromophoric compounds containing a plurality of fiber-reactive radicals, when applied to fibers in accordance with the present invention, enable the attainment of further improved fastness properties in the colored products due to cross-linking between the fibers. In general, the colored fibers produced by the present process may be represented by the formula:

(IV) $\quad D(\text{---}CH_2\text{---}Fiber)_n$ wherein D represents the chromophoric compound (e.g. organic dyestuff molecule), a nuclear carbon atom of which is bonded to the parenthetical group shown.

As stated, any azo coupling component may be employed to provide the B component in the azo dyestuffs of Formula II above. The identity and characteristics of such coupling components have been well documented, as for example see Volume I of Venkataraman cited above, beginning at page 409. Generally such compounds are capable of coupling by reason of an anionoid or nucleophilic center in the compound at which coupling with the diazo component takes place. An important group of azo coupling components are the carbocyclic and heterocyclic compounds containing a nuclearly substituted hydroxy or amino group directing coupling in ortho or para position thereto. Usually, the diazonium coupling reaction with these coupling components is explicable by a mechanism which is in consonance with the accepted theory of aromatic substitution. The yield in the coupling reaction depends on the electro-negativity and accessibility of the site in the carbocyclic or heterocyclic compound at which the attachment of the diazonium group is to take place and on the pH of the reaction mixture which may fall within the acid, neutral or basic range depending upon the particular coupling component employed. The diazonium group attacks a position which has been activated as a site of high electron density. Coupling therefore takes place in the ortho or para position to the directing hydroxyl or amino group in the coupling component. If both of these positions are occupied, no coupling will take place or one of the substituents will be displaced.

Another important group of azo coupling components are the heterocyclic compounds containing a reactive nuclear methylene group usually associated with an adjacent keto group (keto-methylene linkage) as in the 5-pyrazolones. Still another group of azo coupling components are the compounds containing an aliphatic or alicyclic keto-methylene group as in the acylacetic acid arylides and esters.

As examples of suitable azo coupling components falling within the above classifications, there may be mentioned aniline, toluidine, 2-naphthylamine, 2-naphthol, 1-amino-7-naphthol and other amino and/or hydroxy-containing benzenes, naphthalenes and other mono- and poly-carbocyclic aromatic and -heterocyclic aromatic compounds including pyrroles, indoles, 2-hydroxycarbazoles, 3-hydroxydibenzofurans, 2-naphthol-3-carboxylic acid arylamides, amino and hydroxy pyridines and pyrimidines, 2,4-dihydroxyquinoline, 9-methylacridine, 5-pyrazolone, 1 - phenyl - 3 - methyl - 5 - pyrazolone, 1 - phenyl - 5 - pyrazolone-3-carboxylic acid, acetoacetic acid anilide, benzoylacetic acid anilide, and substituted, fused ring, and other derivatives thereof. Such coupling components may contain any desired auxochrome substituents, solubilizing groups, and the like.

In its preferred embodiment, the fiber-reactive chromophoric compounds of the present invention are water (including ready dispersibility in water) to facilitate application thereof to, and promote reaction with, the fiber from an aqueous medium. It is accordingly preferred that such fiber-reactive chromophoric compounds contain at least one ionogenic water-solubilizing group, preferably a sulfonic acid group although other such groups are known and may be employed as for example carboxylic, sulfato, sulfatoethoxy, phosphatoethoxy, and the like. Thus, in the production of the azo dyestuffs of Formula II above, it is convenient to employ an azo coupling component B containing such water-solubilizing group or groups. Alternatively, such water-solubilizing groups may be inserted into any of the present fiber-reactive chromophoric compounds previously (before insertion of the halomethyl group therein) or subsequently and/or as a final step as by sulfonation in known manner, etc.

Still another method of making the fiber-reactive chromophoric compounds of the present invention involves reaction of the compound of Formula I with any reactive chlorine- or bromine-containing dyestuff, chromophoric compound or compound adapted for subsequent conversion to a chromophoric compound or dyestuff in substance or on the fiber such as a diazo component or azo coupling component, in the presence of an acid binding agent, followed by treatment with concentrated HCl or HBr to convert the methylol groups to halomethyl. Such reactive chlorine or bromine atom may be nuclearly bound or present in a reactive radical such as a sulfonyl chloride group ($\text{---}SO_2Cl$), a chloromethyl group (—CH₂Cl), etc. Thus, reaction of 3,5-bishydroxymethyl-4-methyl aniline with bromamine acid, preferably in the presence of an acid binding agent, followed by treatment with concentrated HCl yields a water soluble fiber-reactive anthraquinone dyestuff having the formula:

(V)
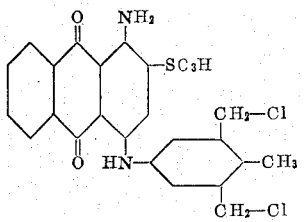

It will be understood that the phenylene ring in the above formula may be substituted by any other aromatic compound of the type described above for Ar.

Similarly, reaction of two moles of 3,5-bishydroxymethyl-4-methyl aniline with one mole of tetrachlorosulfonated copper phthalocyanine followed by treatment with concentrated HCl yields a water soluble phthalocyanine dyestuff reactive with the defined fibers of the formula:

(VI)
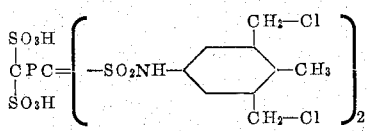

wherein CPC represents the copper phthalocyanine molecule.

Instead of employing compounds of Formula I in the above-described methods for making the present fiber-reactive dyestuffs, the corresponding halomethyl compounds may be employed whereby final treatment with concentrated HCl or HBr can be eliminated. Such compounds containing halomethyl groups can be prepared in known manner by chloromethylation of an acylamine-containing aromatic compound such as acetanilide or 1-naphthylamine-N-acetyl followed by hydrolysis to produce the free amino-containing compounds having the general formula:

(VII) 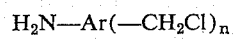

In these compounds, the chloromethyl group is para to the amino group due to the method of chloromethylation and the para-directing influence of the acylamino group. Thus, chloromethylation of acetanilide followed by hydrolysis yields p-amino-benzylchloride (4-chloromethyl-aniline), and similar treatment of 1-acetylaminenaphthalene yields 4-chloromethyl-1-naphthylamine. Hydrolysis should not be too drastic to avoid any tendency to simultaneously hydrolyze the chloromethyl group. It will be understood that use of a bromomethylating agent in the above procedure will produce compounds of Formula VII wherein Cl is replaced by Br. These compounds may be diazotized and coupled with azo coupling components, and otherwise employed as described above for the production of the present fiber-reactive dyestuffs, with omission of the above-described final treatment with concentrated HCl or HBr.

The fiber-reactive chromophoric compounds of the present invention are highly effective for coloring natural and synthetic fibers, preferably those containing an active H atom in the molecule, particularly cellulosic textile fibers, in any desired shades of good to excellent fastness and stability properties. The preferred coloring process involves dyeing (including printing) the fibrous materials by application thereto under acid-binding conditions of an aqueous medium containing a water soluble chromoproric compound of the present invention at any temperature ranging from ambient temperatures to the boiling point of the medium, said compound thereby reacting with the fiber with liberation of acid HX. The medium may have a pH ranging from about 4 to 14, although alkaline conditions are preferred, and may be applied in any desired manner, by continuous or batch methods and by immersion, roller application, padding, spraying, brushing, printing or the like. The aqueous medium is preferably a true or colloidal solution, but may also be in the form of a fine dispersion.

The fiber-reactive chromophoric compounds of this invention are applied to the fiber in any desired proportions depending upon the particular compound and fiber, and the depth of shade desired, generally ranging from about 0.5 to 5% based upon the weight of the fiber in the case of overall dyeings. Similarly, for overall dyeing of the fibrous material, the fiber-treating medium will generally contain the fiber-reactive chromophoric compound in a concentration ranging from about 0.5 to 10% or more.

It will be understood that the water in the above described aqueous medium may be replaced in whole or in part by a water miscible, polar organic solvent such as acetone, alcohol, dioxane, dimethylformamide, or the like without departing from the scope of this invention. Similarly, the medium may also contain adjuvants commonly used in dyeing processes as for example solution aids such as urea an dthiodiglycol, migration inhibitors such as cellulose ethers, sodium chloride, sodium sulfate and other salts, wetting agents preferably of the nonionic surface active type as produced for example by polyoxyethylenation of such reactive hydrogen-containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

The reaction between the reactive chromophoric compound and the fiber containing a reactive hydrogen atom involves liberation of acid HX and is accordingly favored by acid binding conditions. As acid binding agents which may be added to the medium containing the reactive chromophoric compound (and which may also be used where indicated in the production of said compound), there may be mentioned generally alkali metal (sodium, potassium, lithium, etc.) hydroxide, carbonate, bicarbonate, phosphate, silicate, borate, acetate, or the like, or an organic base such as triethan olamine or the like, in an amount sufficient to neutralize the liberated HX in whole or in part. Such amount may range from less than 0.5% up to 10% in the medium.

Instead of adding the acid binding agent to the medium containing the fiber-reactive chromophoric compound, said agent may be applied to the fiber prior to or subsequent to treatment with said medium, the important factor being the treatment of the fibers with the fiber-reactive chromophoric compound in the presence of the acid binding agent. Alternatively, instead of the acid binding agent, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium containing the chromophoric compound, squeezed to, for example, a 50 to 200% liquor pickup, dried and heated at 90 to 350° C. for an hour or more to 30 seconds or less. A dry heat treatment may be substituted by a steaming or the like if desired.

The process of this invention has been found to be highly effective for dyeing and printing cellulosic fibers of natural or synthetic type, such as cotton, linen, wood, paper, regenerated cellulose and the like in any desired shades of good to excellent fastness properties. As a result of the reactive dyeing process of the invention, such dyed or printed fibers are represented by Formula IV above wherein "Fiber" represents a cellulose molecule deprived of a reactive hydrogen atom as originally present for example in hydroxy groups therein. It will be understood that cross-linking exists, with resultant increased fastness properties when $n$ has a value of 2 or more.

In addition to cellulose and its derivatives, the process of this invention may be employed for dyeing other fibers containing reactive H atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings can also be represented by Formula IV above. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano or amide linear or side groups, polyvinyl alcohol, partially hydrolyzed cellulose acetate and polyvinyl acetate, polyvinyl chloride, and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of a staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention and are not to be regarded as limitative. All parts and proportions referred to herein and in the appended claims are by weight unless otherwise indicated.

*Example 1*

(A) A pressure container is charged with 80 parts water, 9.4 parts by weight of 2,6-bis-chloromethyl-4-nitrotoluene and 6.1 parts by weight of potassium carbonate. The charge is agitated at 130° C. for 4 hours to effect hydrolysis. The reaction product, 2,6-bis-methylol-4-nitrotoluene, is filtered off at room temperature and dried.

(B) A pressure shaker is charged with 100 parts by volume ethanol, 4.8 parts by weight of the product from (A) above, and 0.1 part by weight of platinum oxide catalyst (Adam's catalyst). Hydrogen is charged to a pressure of 40 pounds. The pressure falls to 34 pounds within 30 minutes and then remains constant for 30 minutes. The charge is filtered and the filtrate evaporated to obtain the desired 2,6-bis-methylol-4-aminotoluene.

(C) The product from (B) above is diazotized and coupled with 1-(4-sulfophenyl)-3-methyl-5-pyrazolone, and the resulting dyestuff salted out of its acidified (HCl) solution by means of NaCl, filtered and dried.

(D) To activate the product from (C) above by converting the methylol groups to chloromethyl, 3.4 parts by weight of the product and 30 parts by volume of concentrated HCl (36%) are charged into a pressure container and agitated at 100° C. for 1 hour. The temperature could be varied between about 70 to 130° C. with adjustment of duration and pressure. On cooling, the desired fiber-reactive dyestuff separates as a crystalline product and is filtered off. It has the formula:

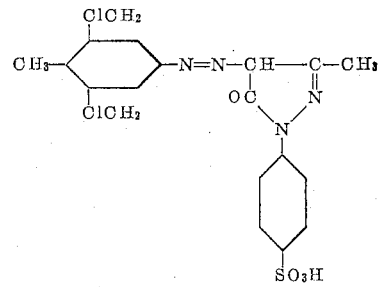

(E) The above dyestuff is applied to cotton cloth by padding in its soda alkaline solution, drying and heat curing at 150° C. for 3 minutes, and washing in boiling detergent solution for 5 minutes to remove unreacted dyestuff. The cotton is dyed a washfast yellow.

*Example 2*

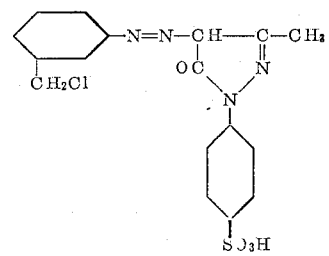

Meta-nitrobenzyl alcohol is reduced catalytically by the method described in Example 1(B), the resulting m-aminobenzyl alcohol diazotized and coupled with 1-(4-sulfophenyl)-3-methyl-5-pyrazolone, and the resulting dyestuff activated by treatment with concentrated HCl as described in Example 1(C) and (D). The recovered crystallized dyestuff has the above formula. A washfast yellow dyeing is obtained when it is applied to cotton as described in Example 1(E).

*Example 3*

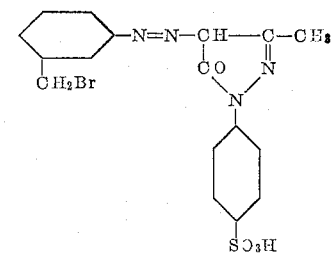

The above dyestuff is obtained by following the procedure of Example 2 but substituting concentrated hydrobromic acid (47–49%) for the HCl in the final activation. It yields similar dyeings on cotton when applied as in Example 2.

Example 4

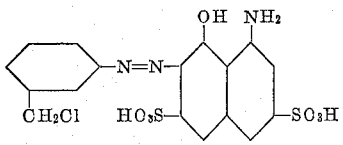

Meta-aminobenzyl alcohol is diazotized and coupled with 1-amino-8-naphthol-3,6-disulfonic acid (H acid). The dyestuff is isolated by salting out with NaCl and acidification with HCl. 9.9 parts by weight of the resulting dyestuff and 60 parts by volume of concentrated hydrochloric acid (36%) are charged into a pressure container and agitated at 100° C. for 2 hours. The crystallized dyestuff, filtered off, has the above formula. When applied to cotton as described in Example 1(E), a washfast violet dyeing is obtained.

Example 5

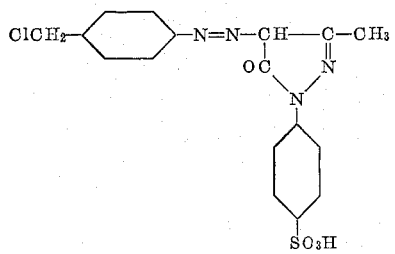

16 grams of p-chloromethyl acetanilide, prepared as described in U.S. 2,849,465, are heated with 75 cc. of 38% HCl at 70–75° C. for 1 hour during which time the solid completely dissolves. Then 75 cc. of water are added and heating continued at 100° C. for 5 minutes to complete the hydrolysis and produce p-aminobenzylchloride (p-chloromethyl aniline).

One-half the total volume of the above solution is diazotized in the usual manner at 0–5° C. The sodium nitrite consumed amounts to 0.040 mole (theory 0.043 mole).

A solution of 17 grams of 1-(4-sulfophenyl)-3-methyl-5-pyrazolone dissolved in 100 cc. of water is added to the above diazo solution containing 250 grams of ice. Careful neutralization to a pH of 8 with 5% NaOH solution produces coupling. The pH is adjusted to 7 with HCl and evaporation to dryness yields a fiber-reactive dyestuff of the above formula.

A dyebath is prepared containing 2 grams of the above dyestuff, 5 grams of soda ash and 93 cc. of water. Cotton cloth is padded in this bath, dried and cured at 150° C. for 3 minutes, and washed with hot detergent solution to remove unreacted dye. A yellow dyeing is obtained with good to excellent fastness to washing and light.

This invention has been disclosed with respect to certain preferred embodiments and various modifications and variations thereof will become obvious to the person skilled in the art. It is to be understood that such modifications and variations are to be included within the spirit and scope of this invention.

We claim:

1. A water soluble azo dyestuff having the formula

B—N=N—Ar(—CH$_2$X)$_n$ wherein B is the residue of an azo coupling component, Ar represents the benzene nucleus, X represents Cl or Br and $n$ is 1 or 2.

2. A dyestuff as defined in claim 1 wherein $n$ has a value of 2.

3. A dyestuff of the formula

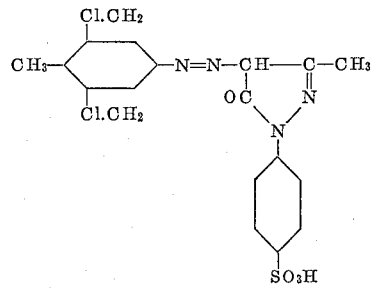

4. A dyestuff of the formula

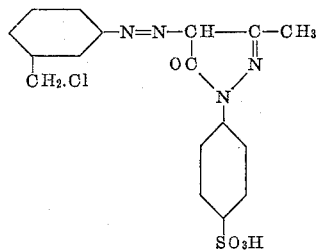

5. A dyestuff of the formula

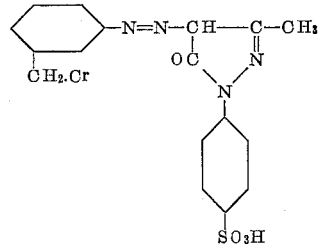

6. A dyestuff of the formula

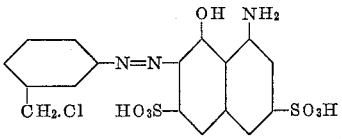

References Cited by the Examiner
UNITED STATES PATENTS

| | | | |
|---|---|---|---|
| 1,886,480 | 11/1932 | Haller et al. | 8—54.2 X |
| 2,332,047 | 10/1943 | Bock et al. | 8—124 |
| 2,339,739 | 1/1944 | Blackshaw et al. | 8—54.2 |
| 2,350,188 | 5/1944 | Pinkney | 8—54.2 |
| 2,842,537 | 7/1958 | Strobel et al. | 260—163 |
| 2,906,747 | 9/1959 | Wolfrum | 260—163 |
| 3,117,962 | 1/1964 | Rohland et al. | 260—162 |
| 3,121,755 | 2/1964 | Braun et al. | 260—372 |

OTHER REFERENCES

Burns et al., J. Chem. Soc. (London), Volume of 1928, pp. 2928–2936.

Houben-Weyl, "Methoden der Organischen Chemie," Volume 5/3, page 837 (1952).

Nanya, C.A., Volume 54, page 24475a (1960).

CHARLES B. PARKER, *Primary Examiner.*

NORMAN G. TORCHIN, *Examiner.*

J. HERBERT, R. FINNEGAN, F. D. HIGEL,
*Assistant Examiners.*

UNITED STATES PATENT OFFICE
CERTIFICATE OF CORRECTION

Patent No. 3,301,846　　　　　　　　　　　　January 31, 1967

Max E. Chiddix et al.

It is hereby certified that error appears in the above numbered patent requiring correction and that the said Letters Patent should read as corrected below.

Column 8, lines 16 to 28, the upper left-hand portion of the formula should appear as shown below instead of as in the patent:

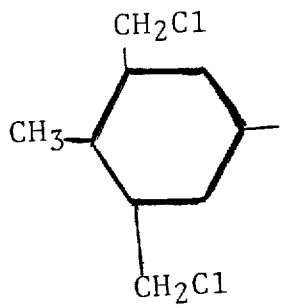

column 10, lines 27 to 36, the upper left-hand portion of the formula should appear as shown below instead of as in the patent:

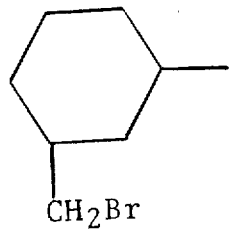

Signed and sealed this 15th day of October 1968.

(SEAL)
ATTEST:

EDWARD M. FLETCHER, JR.
Attesting Officer

EDWARD J. BRENNER
Commissioner of Patents